March 10, 1953 — J. W. WUNSCH — 2,630,766
AUTOMOTIVE CRANE WITH ROAD AND RAIL WHEELS
Filed Jan. 4, 1947 — 3 Sheets-Sheet 1
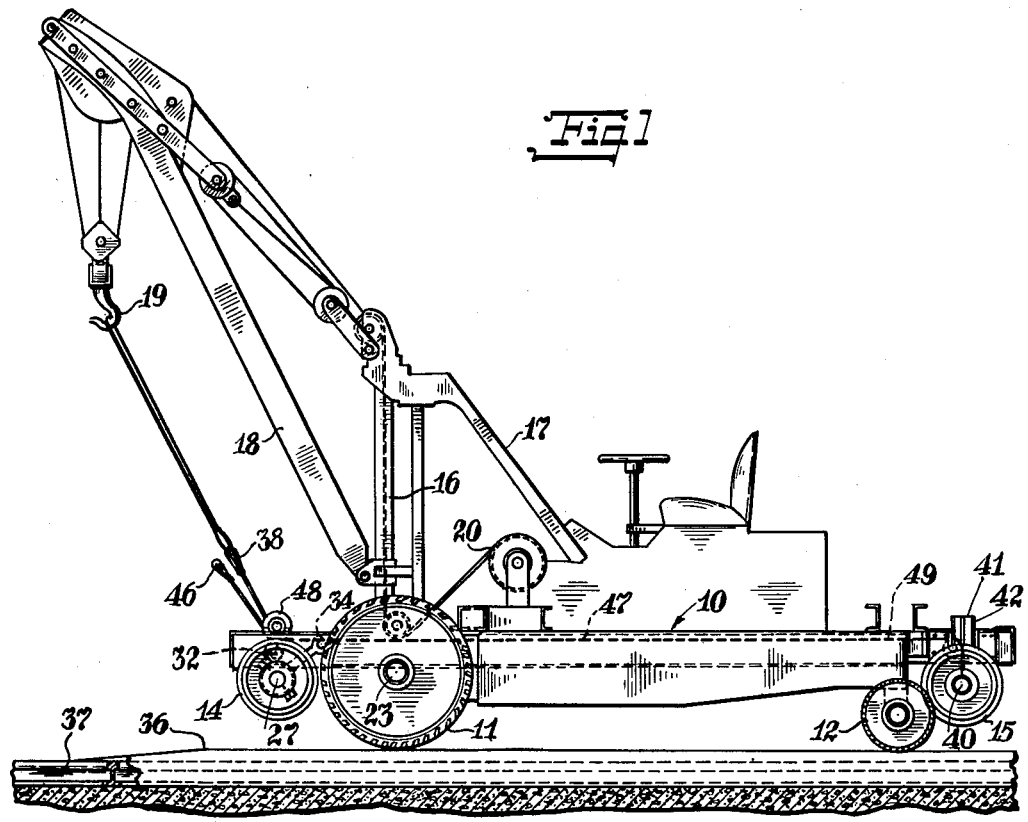
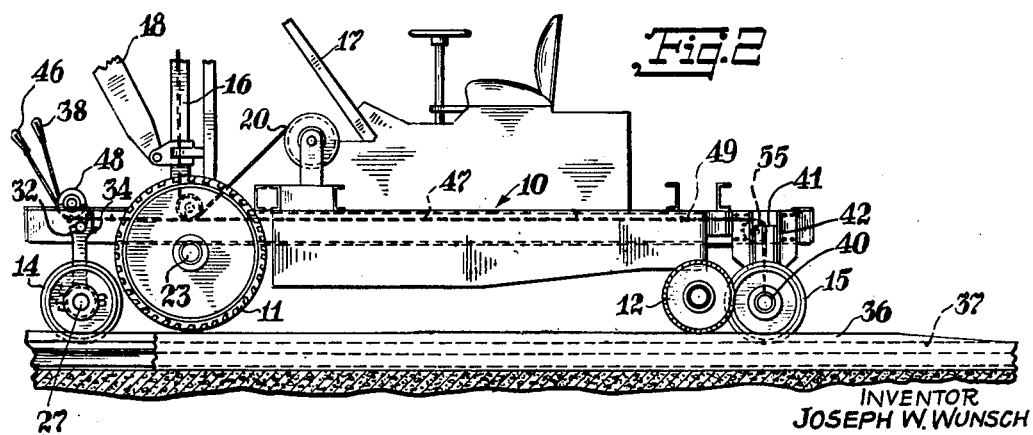
INVENTOR
JOSEPH W. WUNSCH March 10, 1953     J. W. WUNSCH     2,630,766
AUTOMOTIVE CRANE WITH ROAD AND RAIL WHEELS
Filed Jan. 4, 1947     3 Sheets-Sheet 2
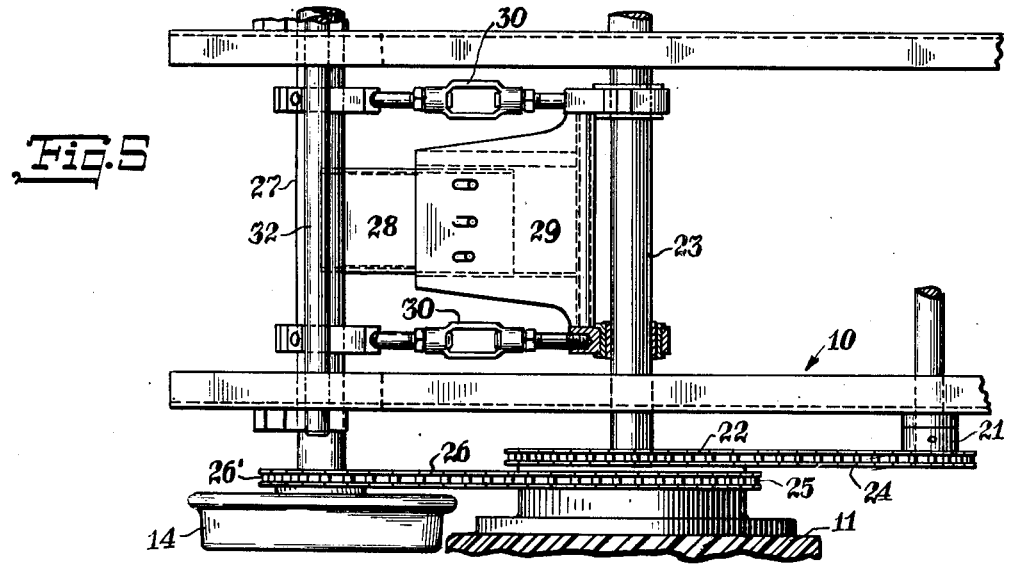
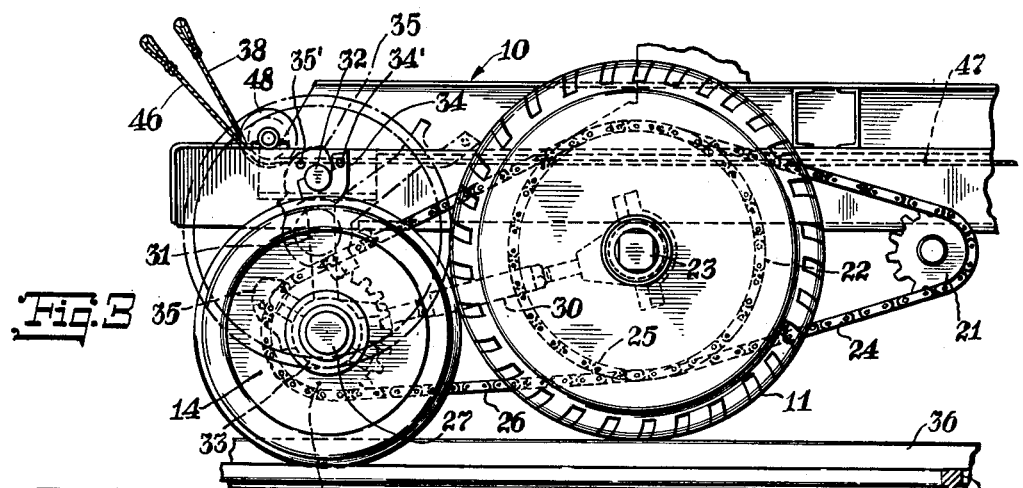
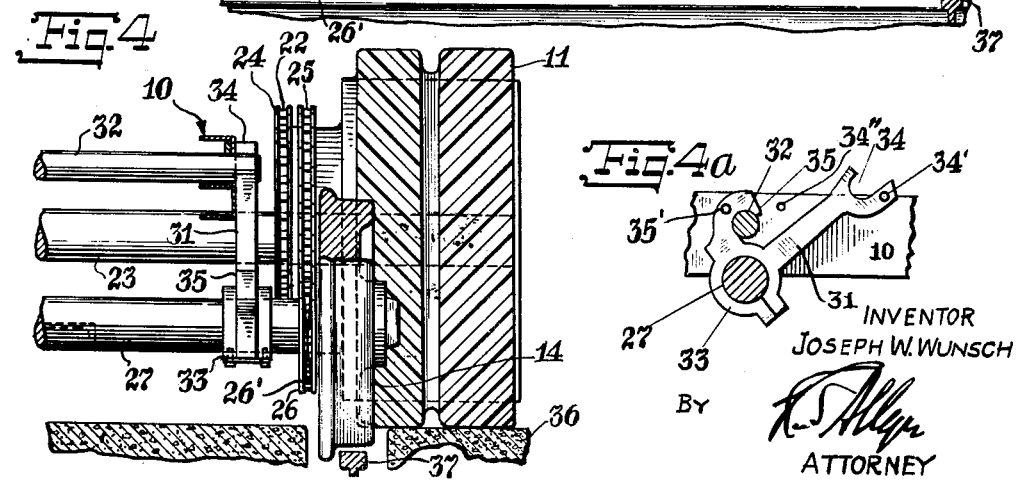
INVENTOR
JOSEPH W. WUNSCH
BY
ATTORNEY March 10, 1953 J. W. WUNSCH 2,630,766
AUTOMOTIVE CRANE WITH ROAD AND RAIL WHEELS
Filed Jan. 4, 1947 3 Sheets-Sheet 3
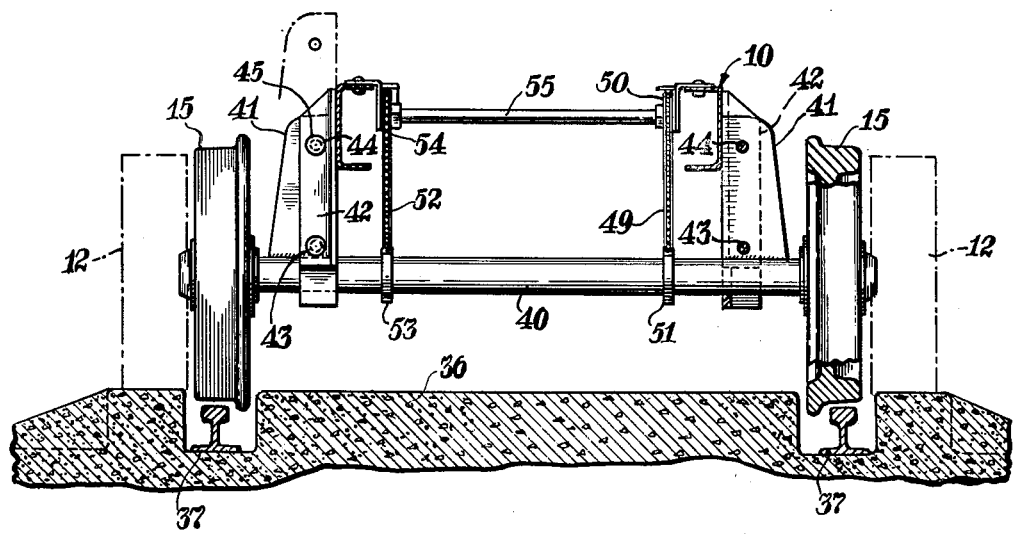
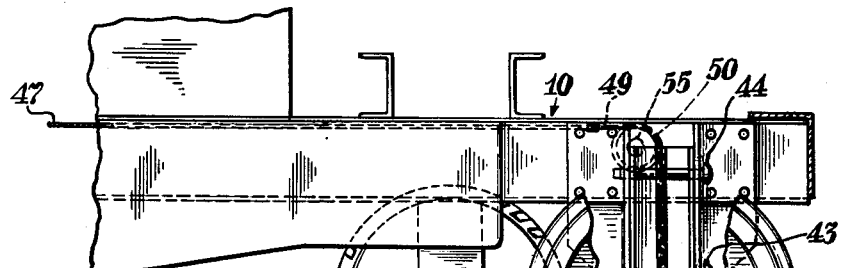
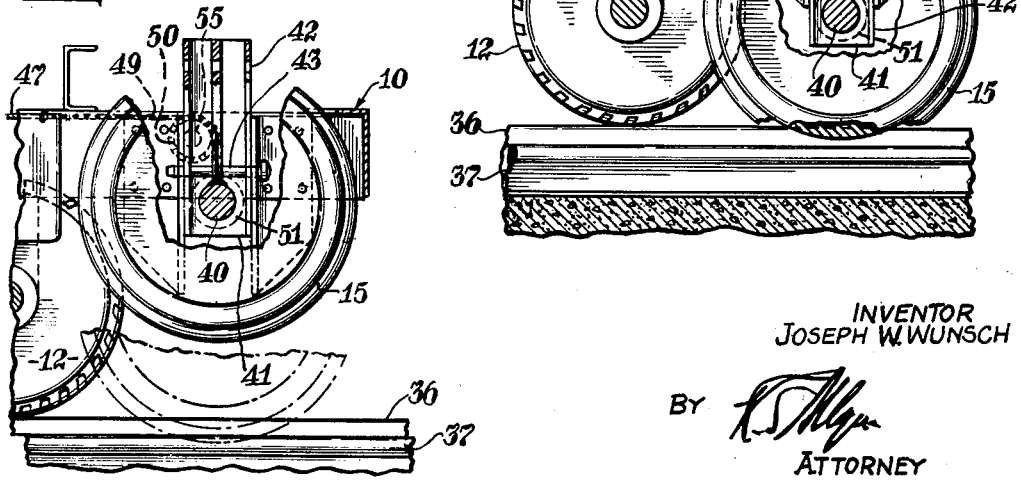
INVENTOR
JOSEPH W. WUNSCH
BY 
ATTORNEY Patented Mar. 10, 1953

2,630,766

UNITED STATES PATENT OFFICE 2,630,766

AUTOMOTIVE CRANE WITH ROAD AND RAIL WHEELS

Joseph W. Wunsch, Brooklyn, N. Y.

Application January 4, 1947, Serial No. 720,180

5 Claims. (Cl. 105—215)

1

The present invention relates to machines which can be operated on a surface such as a road or on rails. Such machines obviously require two sets of wheels, i. e., those having pneumatic or solid tires and those having flanges.

One object is to provide for the convenient adaptation of the machine from road to rail use and vice versa, from rail to road use.

Another object is to obtain a maximum traction effect under varying loads of the crane.

The crane is mounted on the front end of the machine above the traction wheels and the front rail and road wheels are geared together. The road wheels front and rear are mounted at a fixed elevation with respect to the chassis but the rail wheels are made retractable by the aid of the crane hoist. The vehicle when on the road is steered by its rear road wheels.

Fig. 1 is a side view of a machine embodying one form of the invention, the crane boom being raised and with the "rail" wheels raised clear of the ground.

Fig. 2 is a side view of the chassis with the rail wheels down for running on rails.

Fig. 3 is a side view and partial section of the front end of the chassis showing the driving connection between the front wheels and the means for supporting the rail wheels.

Fig. 4 is a front elevation showing the support for a front rail wheel.

Fig. 4a is a side view of one of the struts which connects a front rail wheel with the chassis in the position in which the wheel shaft is supported in a retracted or raised position.

Fig. 5 is a fragmentary plan view showing connections between the shafts for the front road and rail wheels.

Fig. 6 is a rear elevation of the rear rail wheels in their lowered position.

Fig. 7 is a side view of the parts of Fig. 6 and showing the rail wheel in lowered or rail engaging position.

Fig. 8 is a side view of the parts of Fig. 6 and showing the rail wheel dotted in the retracted or raised position.

The chassis 10 may be of any suitable construction and provided with road wheels 11 and 12 of any suitable construction and arranged for steering at the rear. The rail wheels 14 and 15 may be arranged for use on standard or other gauge tracks and the road wheels will usually have a gauge at least as great as the rail wheels.

The crane mast 16 is suitably supported on a frame 17 and provided with a boom 18 of any suitable construction and having a crane hook

2

19, actuated by a hoisting drum 20 and controlled in any suitable manner.

The wheels may be driven by any source of power applied for instance to a sprocket 21 which is connected to a sprocket 22 connected to wheel 11 on shaft 23 by chain 24. Sprocket 25 secured to wheel 11 is connected by chain 26 to sprocket 26' attached to wheel 14.

Shaft 27 for the front rail wheels is connected to the front road wheel shaft 23 by two plates 28 and 29, which also permit adjustment to take up slack in the chain 26. The turn buckle type of spreaders 30 are interposed between the shafts 23 and 27 for taking up the chain.

A strut 31 connects shaft 27 of the front rail wheels with a transverse shaft or rod 32 which is fixed in the chassis 10. This strut is rotatably connected to shaft 27 by a cap piece 33 and has a crotch 34 in which rod 32 rests when the rail wheels are in use the strut being then held in place by a bolt 34' passed through it into a recess 34" in the chassis 10 (see Fig. 3). Hook 35 serves to suspend the shaft 27 when the rail wheels are retracted and not in use, at which time a bolt 35' is passed through the hook into the chassis to hold the strut in the inclined position (see Fig. 4a).

If the machine is resting on the ground wheels 11 and 12 with the rail wheels raised and it is desired to put it on rails, wheels 11 and 12 may be run up on a ramp 36 with the wheels 14 and 15 above and in line with the rails 37. The crane boom is then raised and the hook 19 lowered and engaged directly or indirectly with a sling 38 connected with the shaft 27 which is raised until the hook 35 of strut 31 is free from rod 32. The strut is then tilted toward a vertical position and the shaft and strut lowered till the crotch 34 receives the rod 32 at which time the wheels 14 should be on or near the rail.

The rear rail wheels 15 are mounted to rotate on the shaft 40 which is carried by slider 41 movable vertically between guides 42 of the chassis. When the wheels 15 are in use bolts 43 are passed through holes in the guides and slider so that the weight of the rear end of the vehicle is supported by the wheels 15. When the wheels 15 are retracted they are supported by bolts 44 passed through the upper holes in the guides and the lower holes in the slide (Fig. 7).

The rear rail wheels are lifted by means of the crane when connected to a sling 46, a cable 47 guided by a sheave 48 and connected to chain 49 which passes over sprocket 50 and is connected at 51 to rail wheel shaft 40. The opposite end of shaft 40 is raised at the same time by a chain 52 connected at 53 and passing over a sprocket 54 on countershaft 55 which is rotated by sprocket 50 and chain 49.

To change from the road to rail position the bolts 44 are withdrawn and the rail wheels lowered on to the rails and bolts 43 inserted.

To change from a rail position to a road position the machine may be run up on to a ramp alongside of the rail so as to take the load from the rail wheels which can then be easily retracted by the aid of the crane hoist.

The location of the crane above the front wheels of the machine by which traction is applied ensures a maximum traction effect as the load is applied by the crane whether the machine is running on the road or rail wheels.

This arrangement also makes it possible to utilize the power of the crane to raise and lower not only the front rail wheels but the rear rail wheels as well.

I claim:

1. A mobile crane having a chassis with front and rear load bearing rail wheels and front and rear road load bearing wheels for use on a roadway or ramp, the rail wheels having shafts vertically movable with respect to the road wheels, means for supporting said chassis and road wheels when the rail wheels are lowered, means for raising the front and rear rail wheels including a crane boom mounted on the front end of the chassis above the front rail and road wheels, means connecting the crane boom and said rail wheel shafts for raising and lowering said rail wheel shafts including slings and a flexible member connecting the slings to the boom including a rod supported by the chassis and a strut pivoted at one end on the front wheel shaft and shaped at its other end to receive the rod, and means for supporting said rail wheel shafts in retracted position.

2. A rail and road vehicle comprising a chassis, power driven road wheels supporting the chassis for use on a roadway or ramp, rail running load bearing wheels vertically movable with respect to the chassis, means for supporting the rail wheels from the chassis, means for supporting the chassis on the rail wheels, spreading means connecting the shafts of said road and rail wheels, a lifting crane boom mounted on the chassis above the front road and rail wheels and means actuated by the crane boom for swinging said rail wheels about the axis of the road wheels to raise and lower said rail wheels with respect to the lower tread portions of the road wheels.

3. An automotive crane comprising a chassis having front and rear load bearing road wheels for running on the roadway or on a ramp, front and rear load bearing rail wheels having shafts connected with the shafts of the road wheels, struts hinged at one end on the shaft of the front rail wheels and having hooks for suspending the shaft of the rail wheels from the chassis when the road wheels are in use, said struts having means for supporting the chassis on the rail wheels when the crane is running on rails, a lifting crane boom mounted on the end of the chassis above the front road wheels, and a cable from said crane boom for raising the shafts of the rail wheels when the road wheels are run up on to a ramp.

4. A traveling crane comprising a chassis, a set of front and rear load wheels connected to the chassis for traveling over a road, a set of retractable front and rear load wheels connected to the chassis for traveling over rails, a lifting crane swively supported on the front end of the chassis, said crane including a lifting boom supported above and extending out beyond the front wheels and adapted to swing from side to side, mechanism for retracting said front and rear rail wheels including a sling connected to the front rail wheels, a sling connected to the rear rail wheels and flexible means for selectively connecting either of said slings to the lifting boom, mechanism for holding the front rail wheels in retracted position including struts connected to the shaft of said latter wheels, a transverse rod supported by the chassis and integral hooks on the struts engageable over said rod, and mechanism for holding the rear rail wheels in retracted position including guide devices on the chassis, slider members slidably mounted in said guide devices, said guide devices and slider members having coacting openings and bolts passing through said openings.

5. A traveling crane comprising a chassis, a set of front and rear load wheels connected to the chassis for traveling over a road, a set of retractable front and rear load wheels connected to the chassis for traveling over rails, a lifting crane swively supported on the front end of the chassis, said crane including a lifting boom supported above and extending out beyond the front wheels and adapted to swing from side to side, boom-actuated mechanism for retracting said front and rear rail wheels, and mechanism for holding the front rail wheels and the rear rail wheels in retracted position.

JOSEPH W. WUNSCH.

REFERENCES CITED

The following references are of record in the file of this patent:

UNITED STATES PATENTS

| Number | Name | Date |
|---|---|---|
| 16,762 | Wickersham | Mar. 3, 1857 |
| 1,455,906 | Cox | May 22, 1923 |
| 1,827,898 | Moore | Oct. 20, 1931 |
| 1,937,532 | Ronk | Dec. 5, 1933 |
| 2,140,421 | Fageol | Dec. 13, 1938 |

FOREIGN PATENTS

| Number | Country | Date |
|---|---|---|
| 23,661 | Great Britain | Sept. 19, 1907 |